(12) United States Patent
Park et al.

(10) Patent No.: US 11,655,338 B2
(45) Date of Patent: *May 23, 2023

(54) POLYIMIDE FILM AND FLEXIBLE DISPLAY PANEL INCLUDING THE SAME

(71) Applicants: SK Innovation Co., Ltd., Seoul (KR); SK ie technology Co., Ltd, Seoul (KR)

(72) Inventors: Jin Su Park, Daejeon (KR); Min Sang Park, Daejeon (KR); Hyun Joo Song, Daejeon (KR); Suk Chin Lee, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 43 days.

This patent is subject to a terminal disclaimer.

(21) Appl. No.: 17/349,102

(22) Filed: Jun. 16, 2021

(65) Prior Publication Data

US 2021/0395460 A1    Dec. 23, 2021

(30) Foreign Application Priority Data

Jun. 17, 2020    (KR) .................. 10-2020-0073427

(51) Int. Cl.
*C08G 73/14*    (2006.01)
*C08J 5/18*    (2006.01)

(52) U.S. Cl.
CPC .............. *C08G 73/14* (2013.01); *C08J 5/18* (2013.01); *C08J 2379/08* (2013.01)

(58) Field of Classification Search
CPC ........... C08G 73/1039; C08G 73/1042; C08G 73/14; C08J 2379/08; C08J 5/18; C08J 7/0427
See application file for complete search history.

(56) References Cited

U.S. PATENT DOCUMENTS

| | | | |
|---|---|---|---|
| 10,538,665 | B2 | 1/2020 | Min et al. |
| 10,815,378 | B2 | 10/2020 | Kim et al. |
| 2013/0202869 | A1 | 8/2013 | Cho et al. |
| 2015/0344625 | A1 | 12/2015 | Kino et al. |
| 2018/0013100 | A1 | 1/2018 | Yim et al. |
| 2018/0044475 | A1* | 2/2018 | Park .................. C08G 73/1042 |

FOREIGN PATENT DOCUMENTS

| | | | |
|---|---|---|---|
| JP | 2006160975 | A | 6/2006 |
| JP | 2006291164 | A | 10/2006 |
| JP | 2007030501 | A | 2/2007 |
| JP | 2015096877 | A | 5/2015 |
| JP | 201945804 | A | 3/2019 |
| KR | 1020090025504 | A | 3/2009 |
| KR | 100926872 | B1 | 11/2009 |
| KR | 1020130039939 | A | 4/2013 |
| KR | 1020150018240 | A | 2/2015 |
| KR | 1020150104282 | A | 9/2015 |
| KR | 1020150137700 | A | 12/2015 |
| KR | 1020150138758 | A | 12/2015 |
| KR | 1020160002386 | A | 1/2016 |
| KR | 1020170028083 | A | 3/2017 |
| KR | 1020180001175 | A | 1/2018 |
| KR | 1020180005772 | A | 1/2018 |
| KR | 1020180018307 | A | 2/2018 |
| KR | 101839293 | B1 | 3/2018 |
| KR | 101961115 | B1 | 3/2019 |
| KR | 1020190029110 | A | 3/2019 |
| KR | 101965449 | B1 | 4/2019 |
| KR | 1020190090300 | A | 8/2019 |
| KR | 1020190113018 | A | 10/2019 |
| KR | 102147307 | B1 | 8/2020 |

* cited by examiner

*Primary Examiner* — Lawrence D Ferguson
(74) *Attorney, Agent, or Firm* — The Webb Law Firm

(57) ABSTRACT

Provided are a polyimide-based film, a window cover film, and a display panel including the same. More particularly, a polyimide-based film having different surface properties of both surfaces is provided.

12 Claims, No Drawings

POLYIMIDE FILM AND FLEXIBLE DISPLAY PANEL INCLUDING THE SAME

CROSS-REFERENCE TO RELATED APPLICATION

This application claims priority to Korean Patent Application No. 10-2020-0073427 filed Jun. 17, 2020, the disclosure of which is hereby incorporated by reference in its entirety.

BACKGROUND OF THE INVENTION

Field of the Invention

The following disclosure relates to a polyimide-based film, a window cover film, and a display panel including the same.

Description of Related Art

Portable touch screen panel-based displays are provided with a window cover for display protection on a display panel for protecting the display panel from scratches or external shock.

A display device represented by a thin display device such as a liquid crystal display or an organic light emitting diode display includes various smart devices characterized by portability including various wearable devices as well as smart phones and tablet PCs.

As a window cover for protecting the display device, tempered glass was conventionally used, and recently, a plastic film represented by polyimide is used to impart flexibility, and applied to a foldable or flexible display device.

However, since a plastic film such as polyimide lacks physical properties such as scratch resistance and moisture absorption resistance, various hard coating layers and the like for supplementing scratch resistance and water absorption resistance also satisfying flexibility are coated and laminated thereon.

However, conventionally, when a coating layer was formed on a polyimide-based film for a window cover represented by polyimide, the polyimide-based film has the same chemical properties on both front and back surfaces, and thus, there was no choice but to develop a coating composition limited to a coating composition having affinity with the polyimide-based film.

RELATED ART DOCUMENTS

Patent Documents

Korean Patent Laid-Open Publication No. 10-2017-0028083 (Mar. 13, 2017)

SUMMARY OF THE INVENTION

An embodiment of the present invention is directed to artificially changing a polymer structure of both surfaces of a polyimide-based film using the same one polyimide polymer.

Another embodiment of the present invention is directed to providing a polyimide-based film allowing application of more various coating compositions having different affinities from each other on both surfaces, by artificially changing polymer structural properties to induce different chemical properties and surface properties on both surfaces of the polyimide-based film.

Specifically, the present invention is to provide a polyimide-based film in which a resin density is changed in a film thickness direction to impart a difference in chemical properties and surface properties on both surfaces of the film.

Still another embodiment of the present invention is directed to providing a polyimide-based film in which a resin density of one surface of a substrate film is higher than a resin density of the other surface.

In one general aspect, a polyimide-based film having different surface properties is provided, wherein when a strength of one surface having a higher strength of both surfaces is 100%, a strength of the other surface is 40 to 80% of the strength of the one surface, the strength being quantified by a ratio of an aromatic ring peak intensity measured by Raman spectroscopic analysis.

In an exemplary embodiment, the polyimide-based film has a water contact angle difference between both surfaces of 5° or more, preferably 5° or more and 15° or less and a dynamic friction coefficient difference is 0.1 $\mu D$ or more, preferably 0.1 to 0.5 $\mu D$.

A means for producing the film is not particularly limited, as long as a polyimide-based film expressing the physical properties may be provided. Since within a range satisfying the water contact angle and the dynamic friction coefficient, the surface properties of both surfaces are different from each other as desired, an application range of the coating composition in forming a coating layer may be broadened.

For the above physical properties, after producing a film using one polyimide composition, adjustment of the surface energy of a support on which the film is formed and/or the surface roughness of the support, a drying temperature, a temperature difference between hot air in drying and the composition for forming a film, a drying time, a drying speed of a solvent, and the like are particularly not limited, as long as the physical properties of the present invention may be obtained.

When one non-limiting means to produce the polyimide-based film having the physical properties is taken as an example, the present invention may be achieved by having a material of a support on which the polyimide-based film is cast which has a surface energy of 20 to 100 dyn/cm$^2$ and a surface roughness (Ra) of 0.01 µm or less and maintaining a difference between a temperature of a conductive heat transferred to the support and a temperature of convective air (convective heat) in a drying process of a cast film of 10° C. or more, preferably 10 to 30° C. to adjust a diffusion rate of a solvent, and the means is not particularly limited as long as the physical properties of the present invention are satisfied.

Other features and aspects will be apparent from the following detailed description, the drawings, and the claims.

DESCRIPTION OF THE INVENTION

Hereinafter, the present invention will be described in more detail. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by one of those skilled in the art to which the present invention pertains. The terms used herein are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

In the present invention, a polyimide-based resin is used as a term including an aromatic polyimide resin or an aromatic polyamide-imide resin. A polyimide-based film is also used as a term including both a polyimide film and a polyamide-imide film.

In the present invention, a "polyimide-based resin solution" is used in the same meaning as a "composition for forming a polyimide-based film" and a "polyamide-imide solution". In addition, a polyimide-based film and a solvent may be included for forming the polyimide-based film.

In the present invention, a "film" is obtained by applying the "polyimide-based resin solution" on a support, drying, and peeling off, and though not limited thereto, may have a thickness of 10 to 500 μm, preferably 20 to 250 μm, and more preferably 30 to 150 μm.

In an exemplary embodiment, a polyimide-based film having different surface properties is provided, wherein when a strength of one surface having a higher strength of both surfaces is 100%, a strength of the other surface is 40 to 80% of the strength of the one surface, the strength being quantified by a ratio of an aromatic ring peak intensity measured by Raman spectroscopic analysis.

When the strength is more than 80%, a difference in the physical properties of both surfaces is small, which may not be enough to achieve the physical properties to be desired, and when less than 40%, a resin density is low so that it is difficult to maintain chemical resistance, which may make coating layer formation in a post-process difficult.

As an exemplary embodiment, the polyimide-based film may have a water contact angle difference of both surfaces of 5° or more and a dynamic friction coefficient difference of 0.1 μD or more.

As an exemplary embodiment, a light transmittance may be 5% or more as measured at 388 nm in accordance with ASTM D1746, a total light transmittance may be 87% or more as measured at 400 to 700 nm, a haze may be 2.0% or less, a yellow index may be 5.0 or less, and a value may be 2.0 or less. In a range satisfying all of the above ranges, the film may be appropriate for use as an optical film such as a window cover film of a flexible display.

As an exemplary embodiment, a modulus according to ASTM D882 may be 3 GPa or more and an elongation at break according to ASTM D882 may be 8% or more. In a range satisfying all of the above ranges, the film may be appropriate for use as an optical film such as a window cover film of a flexible display.

As an exemplary embodiment, the polyimide-based film may have a thickness of 10 to 500 μm, but is not limited thereto.

As an exemplary embodiment, the polyimide-based film may include a polyamide-imide structure.

As an exemplary embodiment, the polyimide-based film may include a unit derived from a fluorine-based aromatic diamine.

As an exemplary embodiment, the polyimide-based film may include a unit derived from a cycloaliphatic dianhydride.

As an exemplary embodiment, the polyimide-based film may include a unit derived from a fluorine-based aromatic diamine, a unit derived from an aromatic dianhydride, and a unit derived from an aromatic diacid dichloride.

As an exemplary embodiment, the polyimide-based film may further include a unit derived from a cycloaliphatic dianhydride.

Another exemplary embodiment of the present invention provides a window cover film including: the polyimide-based film according to the exemplary embodiment; and a coating layer formed on least one surface of the polyimide-based film.

The coating layer is any one or more selected from an antistatic layer, an anti-fingerprint layer, an antifouling layer, an anti-scratch layer, a low-refractive layer, an antireflective layer, and shock absorption layer, but is not limited thereto.

Still another exemplary embodiment provides a flexible display panel including the polyimide-based film according to the exemplary embodiment.

Hereinafter, each constituent element of the present invention will be described in more detail.

As long as a polyimide-based film having different surface properties in which when a strength of one surface having a higher strength of both surfaces is 100%, a strength of the other surface is 40 to 80% of the strength of the one surface, the strength being quantified by a ratio of an aromatic ring peak intensity in a structure of a resin of the polyimide-based film, a polyimide-based film having a water contact angle difference between both surfaces of the polyimide-based film of 5° or more, a polyimide-based film having a dynamic friction coefficient difference of both surfaces of 0.1 μD or more, or a polyimide-based film having two or more of the physical properties is provided, the present invention is not particularly limited.

For the polyimide-based film having the physical properties of the present invention, in a process of using one polyimide-based resin solution (also referred to as a polyimide composition) to produce a film, various process variants are adjusted to obtain the physical properties of the present invention, thereby completing the present invention.

As a means of the present invention, the physical properties may be obtained by adjusting surface energy of a support to form a film and/or a surface roughness of the support, a drying temperature, a temperature difference between hot air in drying and a composition for forming a film, a drying time, and/or a drying diffusion rate of a solvent, and the like, and the means is not particularly limited as long as the physical property (properties) of the present invention is obtained.

When one non-limiting means for producing the polyimide-based film having the physical properties is taken as an example, the present invention may be achieved by using a support having a surface energy of 20 to 100 dyn/cm$^2$ or a surface roughness (Ra) of 0.01 μm or less, maintaining a temperature difference between a temperature of conductive heat transferred to the support in a drying process of a cast film and a temperature of convection air (convection heat) of 10° C. or more, preferably 10 to 30° C. to adjust a diffusion rate of a solvent, or using a means for imparting fields such as static electricity in a casting process and/or combining the means with the above means, but this is only any one means among means recognized in the present invention, but the present invention is not limited thereto.

In addition, the polyimide-based film of the present invention may have a light transmittance of 5% or more as measured at 388 nm in accordance with ASTM D1746, a total light transmittance of 87% or more, 88% or more, or 89% or more as measured at 400 to 700 nm, a haze in accordance with ASTM D1003 of 2.0% or less, 1.5% or less, or 1.0% or less, a yellow index in accordance with ASTM E313 of 5.0 or less, 3.0 or less, or 0.4 to 3.0, and a b* value of 2.0 or less, 1.3 or less, or 0.4 to 1.3. In the above range, the polyimide-based film may be appropriate for being applied as an optical film like the window cover film of the flexible display.

In addition, present invention may achieve an effect of widening a subsequent process window (process diversity) so that a coating process using a coating solution having various compositions and an adhesive component is performed well, by expressing different surface properties (water contact angle, dynamic friction coefficient, and chemical resistance) to each other on both surfaces of the polyimide-based film by differentiation of a production process.

In an exemplary embodiment of the present invention, the polyimide-based film is formed of a polyimide-based resin (aromatic polyimide) including an aromatic group, and in an exemplary embodiment, the polyimide-based film may have a thickness of 10 to 500 μm, 20 to 250 μm, or 30 to 110 μm.

The polyimide-based resin is not particularly limited as long as it is an aromatic polyimide-based resin, but a non-limiting example thereof may be an aromatic polyamide-imide-based resin including a fluorine atom and an aliphatic cyclic structure.

In an exemplary embodiment of the present invention, as a preferred example of the aromatic polyamide-imide-based resin including a fluorine atom and an aliphatic cyclic structure, a polyamide-imide polymer may be prepared by preparing an amine-terminated polyamide oligomer derived from a first fluorine-based aromatic diamine and an aromatic diacid dichloride and polymerizing the oligomer with a monomer derived from the amine-terminated polyamide oligomer, a second fluorine-based aromatic diamine, an aromatic dianhydride, and a cycloaliphatic dianhydride. The first fluorine-based aromatic diamine and the second fluorine-based aromatic diamine may be the same or different kinds.

In an exemplary embodiment of the present invention, when the polyamide oligomer block is included as described above, a mole ratio between a diamine monomer including the amine-terminated polyamide oligomer and the second fluorine-based aromatic diamine and a dianhydride monomer including the aromatic dianhydride and the cycloaliphatic dianhydride of the present invention may be 1:0.9 to 1.1, preferably 1:1.

In addition, a content of the amine-terminated polyamide oligomer with respect to the entire diamine monomer is not particularly limited, but it is preferred to include the amine-terminated polyamide oligomer at 30 mol % or more, preferably 50 mol % or more, and more preferably 70 mol % or more for satisfying the mechanical physical properties, the yellow index, and the optical properties of the present invention.

In addition, a composition ratio of the aromatic dianhydride and the cycloaliphatic dianhydride is not particularly limited, but a ratio of 30 to 80 mol %:70 to 20 mol % is preferred considering the transparency, the yellow index, and the mechanical physical properties of the present invention, but the present invention is not necessarily limited thereto.

In an exemplary embodiment of the present invention, the aromatic polyamide-imide-based resin may provide a film which may satisfy optical properties such as transparency and mechanical physical properties, prevents bending occurrence under high-temperature and high-humidity conditions, has a less haze change, and a less thermal contraction, by using a quaternary copolymer including all of the unit derived from a fluorine-based aromatic diamine, the unit derived from an aromatic dianhydride, the unit derived from a cycloaliphatic dianhydride, and in particular, may provide a film having more uniform physical properties in a film thickness direction after stretching, when a film is produced according to the production method of the present invention, and thus, is more preferred, but the present invention is not limited thereto.

In addition, as another example of the present invention, another example of the polyamide-imide-based resin including a fluorine atom and an aliphatic cyclic structure may be a polyamide-imide-based resin obtained by mixing, polymerizing, and imidizing a fluorine-based aromatic diamine, an aromatic dianhydride, a cycloaliphatic dianhydride, and an aromatic diacid dichloride.

The resin has a random copolymer structure, in which 40 mol or more, preferably 50 to 80 mol of the aromatic diacid dichloride may be used with respect to 100 mol of the diamine, a content of the aromatic dianhydride may be 10 to 50 mol and a content of the cyclic aliphatic dianhydride may be 10 to 60 mol, and may be prepared by performing polymerization at a mole ratio of a sum of a diacid dichloride and a dianhydride to the diamine monomer of 1:0.8 to 1.1.

In an exemplary embodiment of the present invention, the fluorine-based aromatic diamine component may be used as a mixture with 2,2'-bis(trifluoromethyl)-benzidine and another known aromatic diamine component, but 2,2'-bis(trifluoromethyl)-benzidine may be used alone. By using the fluorine-based aromatic diamine as such, excellent optical properties may be improved and the yellow index may be improved, based on the mechanical physical properties required in the present invention, as the polyamide-imide-based film. In addition, the micro-flexural modulus of the polyamide-imide-based film may be improved to improve the mechanical strength of the hard coating film and further improve the dynamic bending properties.

As the aromatic dianhydride, at least one or two or more of 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride (SO2DPA), (isopropylidenediphenoxy) bis(phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxyphenyl) dimethylsilane dianhydride (SiDA), and bis(dicarboxyphenoxy) diphenyl sulfide dianhydride (BDSDA) may be used, but the present invention is not limited thereto.

As an example of the cycloaliphatic dianhydride, any one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-en-2,3,5,6-tetracarboxylic dianhydride (BTA), bicyclooxtene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof may be used.

In an exemplary embodiment of the present invention, when the amide structure in the polymer chain is formed by the aromatic diacid dichloride, not only optical physical properties may be improved, but also mechanical strength may be greatly improved, and also the dynamic bending properties may be further improved.

As the aromatic diacid dichloride, a mixture of two or more selected from the group consisting of isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof may be used, but the present invention is not limited thereto.

Hereinafter, a method of producing the polyimide-based film will be illustrated.

In an exemplary embodiment of the present invention, the polyimide-based film may be produced by applying a "polyimide-based resin solution" including a polyimide-based resin and a solvent on a substrate, and performing drying or drying and stretching. That is, the polyimide-based film may be produced by a solution casting method.

The polyimide-based film to be desired in the present invention may be variously adjusted and prepared by various surface properties such as temperature, solvents, mixed solvents, roughness of a casting support, or surface energy, electrical properties, a temperature program of a drying step, a stretching process of a stretching step or a further drying process, impartment of an electric field, or the like in one of the preparation process, and the means is not particularly limited in the present invention as long as the physical properties to be obtained in the present invention are obtained by the physical means described above.

When one non-limiting means for producing the polyimide-based film having the physical properties is taken as an example, the present invention may be achieved by using a support having a surface energy of 20 to 100 dyn/cm$^2$ or a surface roughness (Ra) of 0.01 µm or less, maintaining a temperature difference between a temperature of conductive heat transferred to the support in a drying process of a cast film and a temperature of convection air (convection heat) of 10° C. or more, preferably 10° C. to 30° C. to adjust a diffusion rate of a solvent, or using a means for imparting fields such as static electricity in a casting process and/or combining the means with the above means.

In the production step of the present invention, a polyimide-based resin solution in which a polyimide polymer obtained by imidizing a polyamic acid is dissolved in an organic solvent is prepared, which is applied to a support to form a film.

The imidization step in the present invention may be performed by chemical imidization, and more preferably, by chemical imidization using pyridine and an acetic anhydride. Subsequently, imidization is performed using an imidization catalyst and a dehydrating agent at a low temperature of 150° C. or lower, preferably 100° C. or lower, and more preferably 50 to 150° C. The chemical imidization may impart uniform mechanical physical properties to the entire film as compared with the case of an imidization reaction by heat at a high temperature.

As the imidization catalyst, any one or two or more selected from pyridine, isoquinoline, and β-quinoline may be used. In addition, as the dehydrating agent, any one or two or more selected from an acetic anhydride, a phthalic anhydride, a maleic anhydride, and the like may be used, but the present invention is not necessarily limited thereto.

In addition, an additive such as a flame retardant, an adhesion improver, inorganic particles, an antioxidant, a UV inhibitor, and a plasticizer may be mixed with the polyimide-based resin solution to prepare a polyimide resin.

From the polyimide prepared above, a resin is purified as needed using a solvent to obtain a solid content, which may be dissolved in a solvent to obtain a polyimide-based resin solution. The solvent may include N,N-dimethyl acetamide (DMAc) and the like, but is not limited thereto.

The step of forming a film from the polyimide-based resin solution is performed by applying the polyimide-based resin solution to a substrate, and then drying the solution in a drying step divided into a dry area. In addition, stretching may be performed before or after the drying, and a heat treatment step may be further performed after the drying or stretching step.

As an example of the support of the present invention, glass, stainless steel, or a film, and the like may be used, but for obtaining the physical properties of the present invention, it is preferred to adjust a surface energy to 20 to 100 dyn/cm$^2$, adjust a surface roughness (Ra) to 0.01 µm or less, or satisfy both of them for achieving the physical properties of the present invention.

When the support having the properties is adopted and drying is performed by adjusting a difference between a temperature of a conductive heat transferred to the support in a drying process and a temperature of an atmosphere in a drying area (drying convection air) to 10° C. or more, the produced optical film may be a polyimide-based film having different surface properties in which when a strength of one surface having a higher strength of both surfaces is 100%, a strength of the other surface is 40 to 80% of the strength of the one surface, the strength being quantified by a ratio of an aromatic ring peak intensity, and also a polyimide-based film having a water contact angle difference between both surfaces of 5° or more, having a dynamic friction coefficient difference between both surfaces of 0.1 µD or more, or satisfying both of the physical properties.

The application method in the present invention may be performed by a die coater, an air knife, a reverse roll, spray, a blade, casting, gravure, spin coating, and the like.

According to an exemplary embodiment of the present invention, the polyimide-based film may further include any one or two or more layers selected from a restoration layer, an impact spread layer, a self-cleaning layer, an anti-fingerprint layer, an anti-scratch layer, a low-refractive layer, and an impact absorption layer to provide a window cover film.

In addition, in the present invention, even in the case in which various coating layers are formed on the polyimide-based film as described above, a window cover film having excellent display quality, high optical properties, and a significantly reduced rainbow phenomenon, may be provided.

In the present invention, the window cover film may include any one or more selected from an optical clear adhesive (OCA), an optical clear resin (OCR), a pressure sensitive adhesive (PSA), and the like, but is not limited thereto.

In an exemplary embodiment of the present invention, the window cover film has a high surface hardness, has excellent flexibility, is lighter than tempered glass, and has excellent durability against deformation, and thus, is excellent as a window substrate on the outermost surface of a flexible display panel.

Another exemplary embodiment of the present invention provides a display device including: a display panel and the window cover film described above formed on the display panel.

In an exemplary embodiment of the present invention, the display device is not particularly limited as long as it belongs to a field requiring excellent optical properties, and may be provided by selecting a display panel appropriate therefor. Preferably, the window cover film may be applied to a flexible display device, and specifically, for example, may be included and applied to any one or more image display devices selected from various image display devices such as a liquid crystal display device, an electroluminescence display device, a plasma display device, and a field emission display device display, but is not limited thereto.

The display device including the window cover film of the present invention described above has excellent display quality to be displayed and significantly decreased distortion caused by light, and thus, may have a significantly improved rainbow phenomenon in which iridescent stain occurs and minimize user's eye strain with excellent visibility.

Hereinafter, the present invention will be described in more detail with reference to the Examples and Comparative Examples. However, the following Examples and Comparative Examples are only an example for describing the present invention in more detail, and do not limit the present invention in any way.

Hereinafter, the physical properties were measured as follows:

1) Pencil Hardness

According to JIS K 5400, a line of 20 mm was drawn at a rate of 50 mm/sec on a film using a load of 750 g, this operation was repeated 5 times or more, and the pencil hardness was measured based on the case in which one or more scratches occurred.

2) Modulus and Elongation at Break

The modulus was measured using UTM 3365 available from Instron, under the condition of pulling a polyimide-based film having a length of 50 mm and a width of 10 mm at 50 mm/min at 25° C., according to ASTM D882. The thickness of the film was measured and the value was input to the instrument. The unit of the modulus was GPa.

The elongation at break was measured using UTM 3365 available from Instron, under the condition of pulling a polyimide-based film having a length of 50 mm and a width of 10 mm at 50 mm/min at 25° C., according to ASTM D882. The thickness of the film was measured and the value was input to the instrument. The unit of the elongation at break was %.

3) Light Transmittance

A total light transmittance was measured at the entire wavelength area of 400 to 700 nm using a spectrophotometer (from Nippon Denshoku, COH-400) and a single wavelength light transmittance was measured at 388 nm using UV/Vis (Shimadzu, UV3600), on a film having a thickness of 50 μm, in accordance with the standard of ASTM D1746. The unit was %.

4) Haze

The haze was measured using a spectrophotometer (from Nippon Denshoku, COH-400), on a film having a thickness of 50 μm, in accordance with the standard of ASTM D1003. The unit was %.

5) Yellow Index (YI) and b* Value

The yellow index and the b* value were measured using a colorimeter (from HunterLab, ColorQuest XE), on a film having a thickness of 50 μm, in accordance with the standard of ASTM E313.

6) Weight Average Molecular Weight (Mw) and Polydispersity Index (PDI)

The weight average molecular weight and the polydispersity index of the produced film were measured by dissolving a film sample in a DMAc solution containing 0.05 M LiBr and using GPC (Waters GPC system, Waters 1515 isocratic HPLC Pump, Waters 2414 Refractive Index detector). During measurement, as a GPC column, Olexis, Polypore, and mixed D columns were connected, as a solvent, a DMAc solution was used, as a standard material, polymethylmethacrylate (PMMA STD) was used, and the analysis was performed at 35° C. at a flow rate of 1 mL/min.

7) Measurement of Aromatic Ring Intensity

An aromatic ring peak of 1611 $cm^{-1}$ was measured by Raman spectroscopic analysis in which an excitation wavelength of 532 nm, a laser spot of 1 μm, and a thickness direction measurement interval of 1 μm were set on a polyimide-based film.

The analysis was performed as follows:

Instrument name: Raman Microscope

Manufacturer: Renishaw(UK)

Model name: inVia

A laser was focused on a film surface (referred to as surface A) and started to enter into the film at thickness direction measurement intervals (depth intervals) of 1 μm to measure aromatic ring peak intensity at 1611 $cm^{-1}$ for each datapoint.

Here, since laser speeds when passing through the inside of the film and when passing through the air are different due to a refractive index difference between the air and a film interface and the intensity was measured differently, when the laser entered from a film surface (surface A) to a bottom surface (referred to as surface B), the data was obtained after removing points from a starting point to a 6th point and points from a first point to the 6th point in a direction of surface A on the bottom surface (referred to as surface B).

For example, when measurement data of a total of 80 points was obtained, points from the first point to the 6th point on each interface were excluded. That is, when the intensity of 7th point was $I_1$, the intensity of 74th point was $I_2$, and the intensity of $I_1$ was higher, the relative intensity of $I_2$ was calculated as follows:

$$\text{Relative intensity (\%)} = 100/I_1 I_2$$

8) Method of Measuring Water Contact Angle Difference

The measurement was performed in a substance air mode of surrounding phase using Mobile Surface Analyzer (MSA) available from KRUSS, a repeat number of 10, a delay of 1, and an interval of 1 were set up, and 9 points per an A4 size were measured and the average value thereof was determined.

9) Method of Measuring Surface Roughness

For the surface roughness, AFM was measured using ICON available from Bruker, a center line average roughness was determined, a sum of the entire area above and below the center line was determined, and the value was divided by a length of a measurement section to calculate a Ra value.

10) Method of Measuring Dynamic Friction Coefficient

The dynamic friction coefficient was measured using TOYOSEIKI equipment. When measuring the dynamic friction coefficient, a sample was cut into a size of 100×100 mm. A measurement speed of 100 mm/min, a measurement distance of 50 mm, and a measurement load of 200 g were set. The same sample as the cut sample was attached to a wool felt installed in the equipment using a thin glass (20×20 mm) and a double-sided tape. The cut film (100 mm×100 mm) was attached on a flat plate and a wool felt glass wrapped with the same film was placed thereon to perform measurement.

EXAMPLE 1

Terephthaloyl dichloride (TPC) and 2,2'-bis(trifluoromethyl)-benzidine (TFMB) were added to a mixed solution of dichloromethane and pyridine in a reactor, and stirring was performed at 25° C. for 1.5 hours under a nitrogen atmosphere. At this time, a mole ratio of TPC:TFMB was 320:400, and a solid content was adjusted to 10 wt %. Thereafter, the reactant was precipitated in an excessive amount of methanol and filtered to obtain a solid content, which was dried under vacuum at 50° C. for 8 hours or more to obtain an oligomer, and the prepared oligomer had a formula weight (FW) of 2020 g/mol.

N,N-dimethylacetamide (DMAc), 100 mol of the oligomer, and 20 mol of 2,2'-bis(trifluoromethyl)-benzidine (TFMB) were added to the reactor and sufficient stirring was performed. After confirming that the solid raw material was completely dissolved, fumed silica (surface area of 95 m$^2$/g, <1 μm) was added to DMAc at a content of 1000 ppm relative to the solid content, and added to the reactor after being dispersed using ultrasonic waves. 60 mol of 1,2,3,4-cyclobutanetetracarboxylic dianhydride (CBDA) and 60 mol of 4,4'-hexafluoroisopropylidene diphthalic anhydride (6FDA) were subsequently added, sufficient stirring was performed, and the mixture was polymerized at 40° C. for 12 hours. Here, the solid content was 20%. Subsequently, each of pyridine and acetic anhydride was added at 2.5-fold relative to the total content of dianhydride, and stirring was a performed at 60° C. for 10 hours to prepare a polyimide-based resin solution.

The polyimide-based resin solution was cast on a PET film having a surface roughness of 0.015 μm used as a support, and dried for 20 minutes with a temperature difference between a set temperature in a drying area and a temperature transferred to the support being 12° C.

The physical properties of the obtained optical film were measured, and an aromatic ring peak intensity difference, a water contact angle difference, and a dynamic friction coefficient difference are shown in Table 1.

In addition, the thus-produced polyamide-imide film had a thickness of 53 μm, a total light transmittance of 89.7%, a haze of 0.29, a yellow index (YI) of 1.6, a b* value of 1.1, a modulus of 6.9 GPa, an elongation at break of 20.1%, a weight average molecular weight of 325,000 g/mol, a polydispersity index (PDI) of 2.21, and a pencil hardness of HB/750 g.

EXAMPLE 2

In Example 1, the polyimide-based resin solution was applied on the support having a surface roughness adjusted to 0.018 μm, and dried for 20 minutes with a temperature difference between a set temperature in a drying area and a temperature transferred to the support being 20° C.

The physical properties of the thus-produced polyamide-imide film were similar to those of Example 1, and an aromatic ring peak intensity difference, a water contact angle difference, and a dynamic friction coefficient difference are shown in Table 1.

EXAMPLE 3

In Example 1, the polyimide-based resin solution was applied on the support having a surface roughness adjusted to 0.02 μm, and dried for 20 minutes with a temperature difference between a set temperature in a drying area and a temperature transferred to the support being 25° C.

The physical properties of the thus-produced polyamide-imide film were similar to those of Example 1, and an aromatic ring peak intensity difference, a water contact angle difference, and a dynamic friction coefficient difference are shown in Table 1.

EXAMPLE 4

In Example 1, the polyimide-based resin solution was applied on the support having a surface roughness adjusted to 0.022 μm, and dried for 20 minutes with a temperature difference between a set temperature in a drying area and a temperature transferred to the support being 20° C.

The physical properties of the thus-produced polyamide-imide film were similar to those of Example 1, and an aromatic ring peak intensity difference, a water contact angle difference, and a dynamic friction coefficient difference are shown in Table 1.

Comparative Example 1

The process was performed in the same manner as in Example 1, except that the surface roughness was adjusted to 0.2 μm, and the results are shown in Table 1.

Comparative Example 2

In Example 1, the polyimide-based resin solution was applied on the support having a surface roughness adjusted to 0.3 μm, and dried for 20 minutes with a temperature difference between a set temperature in a drying area and a temperature transferred to the support being 20° C. The results are shown in Table 1.

Comparative Example 3

In Example 1, the polyimide-based resin solution was applied on the support having a surface roughness adjusted to 0.015 μm, and dried for 20 minutes with a temperature difference between a set temperature in a drying area and a temperature transferred to the support being 8° C. The results are shown in Table 1.

Comparative Example 4

In Example 1, the polyimide-based resin solution was applied on the support having a surface roughness adjusted to 0.015 μm, and dried for 20 minutes with a temperature difference between a set temperature in a drying area and a temperature transferred to the support being 32° C.

TABLE 1

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Surface roughness | | 0.015 | 0.018 | 0.02 | 0.022 | 0.2 | 0.3 | 0.015 | 0.015 |
| Temperature difference (° C.) | | 12 | 20 | 25 | 20 | 12 | 20 | 8 | 32 |
| Time (min) | | 20 | 20 | 20 | 20 | 20 | 20 | 20 | 20 |
| Aromatic ring intensity | Surface A | 1.09 | 1.15 | 1.15 | 1.07 | 1.02 | 1.01 | 1.02 | 1.03 |
| | Surface B | 0.67 | 0.60 | 0.60 | 0.65 | 0.83 | 0.82 | 0.83 | 0.84 |
| | Relative intensity (%) | 61.5 | 52.2 | 52.2 | 60.7 | 81.4 | 81.2 | 81.4 | 81.6 |
| Water contact angle | Surface A | 92.56 | 95.99 | 95.83 | 95.26 | 92.37 | 93.55 | 93.33 | 95.32 |
| | Surface B | 85.88 | 90.84 | 86.92 | 84.47 | 90.81 | 89.52 | 92.52 | 92.23 |
| | Difference | 6.68 | 5.15 | 8.91 | 10.79 | 1.56 | 4.03 | 0.81 | 3.09 |
| Dynamic friction coefficient | Surface A | 0.42 | 0.43 | 0.45 | 0.50 | 0.45 | 0.43 | 0.42 | 0.43 |
| | Surface B | 0.55 | 0.57 | 0.57 | 0.69 | 0.54 | 0.48 | 0.45 | 0.46 |
| | Difference | 0.13 | 0.14 | 0.12 | 0.19 | 0.09 | 0.05 | 0.03 | 0.03 |

As seen in the above Table 1, it was confirmed that in a range of, when the aromatic ring intensity of one surface was 100%, the aromatic ring intensity of the other surface of 40 to 80%, the water contact angle difference was 5° or more and the dynamic friction coefficient difference was 0.1 μD or more. In addition, since the surface properties of both surfaces were different in this range, a coating layer may be formed on an appropriate surface depending on the composition in a subsequent process such as hard coating layer formation, and thus, selectivity of composition may be expanded.

The present invention was made by recognizing that the surface properties of transparent polyimide play a very important role in coatability of a coating composition coated on a polyimide-based film the physical properties and process stability of a product included in the coating composition.

It is necessary to apply a coating solution and an adhesive having various compositions for imparting various functional coating layers to a polyimide-based film, and the polyimide-based film of the present invention is very important in that it allows the application. When the surface properties are fixed to one, a coating process of a coating liquid having various compositions (coating solution or adhesive) may become difficult, and a width of property adjustment after coating may be narrowed, but the polyimide-based film according to the present invention may solve the problem.

The present invention may allow the surface properties of a transparent polyimide-based film to be variously adjusted, which may be achieved by a method of chemical structure change using a physical means of both surfaces.

Accordingly, the present invention achieves an effect of expanding a process diversity of a subsequent process so that a coating process using a coating solution having various compositions and adhesive components is well performed, for example, by expressing different surface properties (water contact angle, dynamic friction coefficient, and chemical resistance) to each other on both surfaces of the transparent polyimide-based film by differentiation of a production process of the transparent polyimide-based film.

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

What is claimed is:

1. A polyimide-based film having different surface properties, wherein when a strength of one surface of both surfaces is 100%, a strength of the other surface is 40 to 80% of the strength of the one surface, the strength being quantified by a ratio of an aromatic ring peak intensity measured by Raman spectroscopic analysis,
wherein the polyimide-based film has a light transmittance of 5% or more as measured at 388 nm according to ASTM D1746, a total light transmittance of 87% or more as measured at 400 to 700 nm, a haze of 2.0% or less, a yellow index of 5.0 or less, and a b* value of 2.0 or less.

2. The polyimide-based film of claim 1, wherein the polyimide-based film has a water contact angle difference of both surfaces of 5° or more and a dynamic friction coefficient difference of 0.1 μd or more.

3. The polyimide-based film of claim 1, wherein the polyimide-based film has a modulus according to ASTM D882 of 3 GPa or more and an elongation at break according to ASTM D882 of 8% or more.

4. The polyimide-based film of claim 1, wherein the polyimide-based film has a thickness of 10 to 500 μm.

5. The polyimide-based film of claim 1, wherein the polyimide-based film has a polyamide-imide structure.

6. The polyimide-based film of claim 5, wherein the polyimide-based film includes a unit derived from a fluorine-based aromatic diamine.

7. The polyimide-based film of claim 5, wherein the polyimide-based film includes a unit derived from a cycloaliphatic dianhydride.

8. The polyimide-based film of claim 5, wherein the polyimide-based film includes a unit derived from a fluorine-based aromatic diamine, a unit derived from an aromatic dianhydride, and a unit derived from an aromatic diacid dichloride.

9. The polyimide-based film of claim 8, wherein the polyimide-based film further includes a unit derived from a cycloaliphatic dianhydride.

10. A window cover film comprising:
the polyimide-based film of claim 1; and
a coating layer formed on least one surface of the polyimide-based film.

11. The window cover film of claim 10, wherein the coating layer is any one or more selected from an antistatic layer, an anti-fingerprint layer, an antifouling layer, an anti-scratch layer, a low-refractive layer, an antireflective layer, and shock absorption layer.

12. A flexible display panel comprising the polyimide-based film of claim 1.

* * * * *

UNITED STATES PATENT AND TRADEMARK OFFICE
CERTIFICATE OF CORRECTION

PATENT NO. : 11,655,338 B2  Page 1 of 1
APPLICATION NO. : 17/349102
DATED : May 23, 2023
INVENTOR(S) : Jin Su Park et al.

It is certified that error appears in the above-identified patent and that said Letters Patent is hereby corrected as shown below:

In the Claims

Column 14, Line 45, Claim 2, delete "μd" and insert -- μD --

Signed and Sealed this
Twenty-fifth Day of July, 2023

Katherine Kelly Vidal
*Director of the United States Patent and Trademark Office*